US012737360B2

(12) United States Patent
Almasan et al.

(10) Patent No.: US 12,737,360 B2
(45) Date of Patent: Sep. 15, 2026

(54) DATA PROCESSING IN AN OPTIMIZED ANALYTICS ENVIRONMENT

(71) Applicant: American Express Travel Related Services Company, Inc., New York, NY (US)

(72) Inventors: Rares Ioan Almasan, Phoenix, AZ (US); Anand Vijai Mavelipatty Rangasamy, Phoenix, AZ (US); Todd W. Oulton, Phoenix, AZ (US); Ravi Peethala, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 31 days.

(21) Appl. No.: 18/189,736

(22) Filed: Mar. 24, 2023

(65) Prior Publication Data

US 2023/0229661 A1 Jul. 20, 2023

Related U.S. Application Data

(63) Continuation of application No. 16/375,732, filed on Apr. 4, 2019, now Pat. No. 11,636,109.

(51) Int. Cl.
*G06F 16/2453* (2019.01)
*G06F 16/2457* (2019.01)

(52) U.S. Cl.
CPC .. *G06F 16/24549* (2019.01); *G06F 16/24578* (2019.01)

(58) Field of Classification Search
CPC .................... G06F 16/24578; G06F 16/24549
USPC ........................................................ 707/713
See application file for complete search history.

(56) References Cited

U.S. PATENT DOCUMENTS

| | | | |
|---|---|---|---|
| 9,342,626 B1* | 5/2016 | Das | G06F 16/24578 |
| 2004/0117189 A1 | 6/2004 | Bennett | |
| 2009/0287658 A1 | 11/2009 | Bennett | |
| 2014/0201241 A1 | 7/2014 | Wood et al. | |
| 2016/0364502 A1* | 12/2016 | Wu | G06F 16/9535 |
| 2017/0116260 A1 | 4/2017 | Chattopadhyay | |
| 2018/0113857 A1 | 4/2018 | Mora et al. | |
| 2018/0165330 A1* | 6/2018 | Halbani | G06F 16/24522 |
| 2019/0042601 A1 | 2/2019 | Ashe et al. | |
| 2019/0108228 A1* | 4/2019 | Zeng | G06F 16/24522 |
| 2020/0151206 A1* | 5/2020 | Balakavi | G06F 16/3344 |
| 2020/0192903 A1* | 6/2020 | Bansal | G06F 16/2237 |
| 2020/0294498 A1* | 9/2020 | Bhaya | G10L 15/22 |
| 2020/0302122 A1 | 9/2020 | Lai et al. | |

* cited by examiner

*Primary Examiner* — Mohammad Ali
(74) *Attorney, Agent, or Firm* — Thomas | Horstemeyer, LLP

(57) ABSTRACT

Systems and methods for data Process an optimized analytics environment are disclosed. The system may enable users to create data processing requests, interact with various data sources and datasets, and generate data processing outputs. The system may receive a data processing request from an audio-enabled input source or a UI-based input source. The system may determine whether the data processing request at least partially matches a stored data processing request. The system may receive a data processing request selection comprising the data processing request or the stored data processing request. The system may execute the data processing request selection on a data source.

20 Claims, 6 Drawing Sheets

DATA PROCESSING IN AN OPTIMIZED ANALYTICS ENVIRONMENT

CROSS-REFERENCE TO RELATED APPLICATION

This application is a continuation of, claims priority to and the benefit of U.S. Ser. No. 16/375,732 filed Apr. 4, 2019 and entitled "Data Processing in an Optimized Analytics Environment," which is incorporated herein in its entirety.

TECHNICAL FIELD

The disclosure generally relates to data processing, and more specifically, to systems and methods for data processing in an optimized analytics environment.

BACKGROUND

Data processing requests may be executed on a variety of data sources across multiple platforms. A data processing request may rely on a variety of technical resources to generate a data output including, for example, various technologies, systems, databases, platforms, and visual output technologies. Typically, a user drafting and executing the data processing request must understand the technical resources, technologies, and processes needed to manually execute, the data processing request, in order to correctly execute the data processing request on the needed data sources. Moreover, users may not interact with other users drafting and executing similar data processing requests, leading to redundant data processing operations, along with duplicate data outputs and other data residing within the platform ecosystem. The redundant data processing operations and duplicate data and data outputs may cause inefficient resource utilization (e.g., with CPU, RAM, storage, etc.) and monetary waste.

SUMMARY

Systems, methods, and articles of manufacture (collectively, the "system") for data processing in an optimized analytics environment are disclosed. The system may receive a data processing request. The system may determine whether the data processing request at least partially matches a stored data processing request, wherein the stored data processing request is associated with a processing ranking. The system may receive a data processing request selection comprising the data processing request or the stored data processing request. The system may execute the data processing request selection on a data source. In various embodiments, the system may generate a data processing output based on the executing the data processing request. The system may generate a second processing ranking of the data processing output. The processing ranking and/or the second processing ranking may be generated based on an, efficiency metric associated with the executing the data processing request. The step of determining a partial match between data processing requests may comprise comparing at least one of the type of query, a query data source, or a query dataset. The data processing request may be received from an audio-enabled input source. The data processing request may be received from a UI-based input source.

In various embodiments, the system may receive an audio data processing request, wherein the audio data processing request comprises a plain-language processing request not recited in a query language. The system may translate the audio data processing request into a data processing request, wherein the data processing request comprises a technical processing request recited in the query language. The system may determine whether the data processing request at least partially matches a stored data processing request, wherein the stored data processing request is associated with a processing ranking. The system may receive a data processing request selection comprising the data processing request or the stored data processing request. The system may execute the data processing request selection on a data source.

In various embodiments, the system may generate a data processing output based on the executing the data processing request. The system may generate a second processing ranking of the data processing output. The processing ranking and/or the second processing ranking may be generated based on an efficiency metric associated with the executing the data processing request. The step of determining a partial match between data processing requests may comprise comparing at least one of the type of query, a query data source, or a query dataset. The system may parse the audio data processing request into a plurality of subsections. The step of translating the audio data processing request may comprise comparing at least one of a word or a phrase from each subsection of the audio data processing request against a voice dictionary to determine the technical language for each subsection. The voice dictionary may comprise one or more of a known action, a known object, a known visual output, a known data source, or a known dataset.

In various embodiments, the system may receive an audio date processing request, wherein the audio data processing request is received from an audio-enabled input source. The system may parse the audio data processing request into a plurality of subsections. The system may translate each subsection of the parsed audio data processing request into a technical processing request. The system may generate a data processing request comprising each of the technical processing requests.

In various embodiments, the step of translating each subsection of the audio data processing request comprises comparing at least one of a word or a phrase from each subsection of the audio data processing request against a voice dictionary to determine the technical language for each subsection. The system may also execute the data processing request on a data source. The system may determine whether the data processing request at least partially matches a stored data processing request. The system may receive a data processing request selection comprising the data processing request or the stored data processing request. The system may execute the data processing request selection on the data source. The audio data-processing request may comprise a plain-language processing request not recited in a query language.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding Of the present disclosure, however, may be obtained by referring to the detailed description and claims when considered in connection with the drawing figures, wherein like numerals denote like elements.

DETAILED DESCRIPTION

In various embodiments, a system too data processing in an optimized analytics environment is disclosed. The system may enable users to create data processing requests, interact various data sources and datasets, and generate data processing outputs, all without needing the user to understand and be proficient in the technical resources, technologies, and processes. Such technical resources, technologies, and processes are typically needed in manual executions of data processing requests. In various embodiments, the user may create data processing requests and interact the data-processing system using audio commands. The system may translate the audio commands to generate the technical processing request to be executed.

The system may increase efficiencies of data processing requests, decrease redundant data processing operations, and decrease duplicate data outputs by presenting users with similar data processing requests that were previously executed in the system. The user may select one of the similar data processing operations or select to execute the original data processing request. In that regard, the system may efficiently utilize system resources (e.g., with CPU, RAM, storage, etc.) and decrease monetary waste compared to typical systems.

Figure 1:
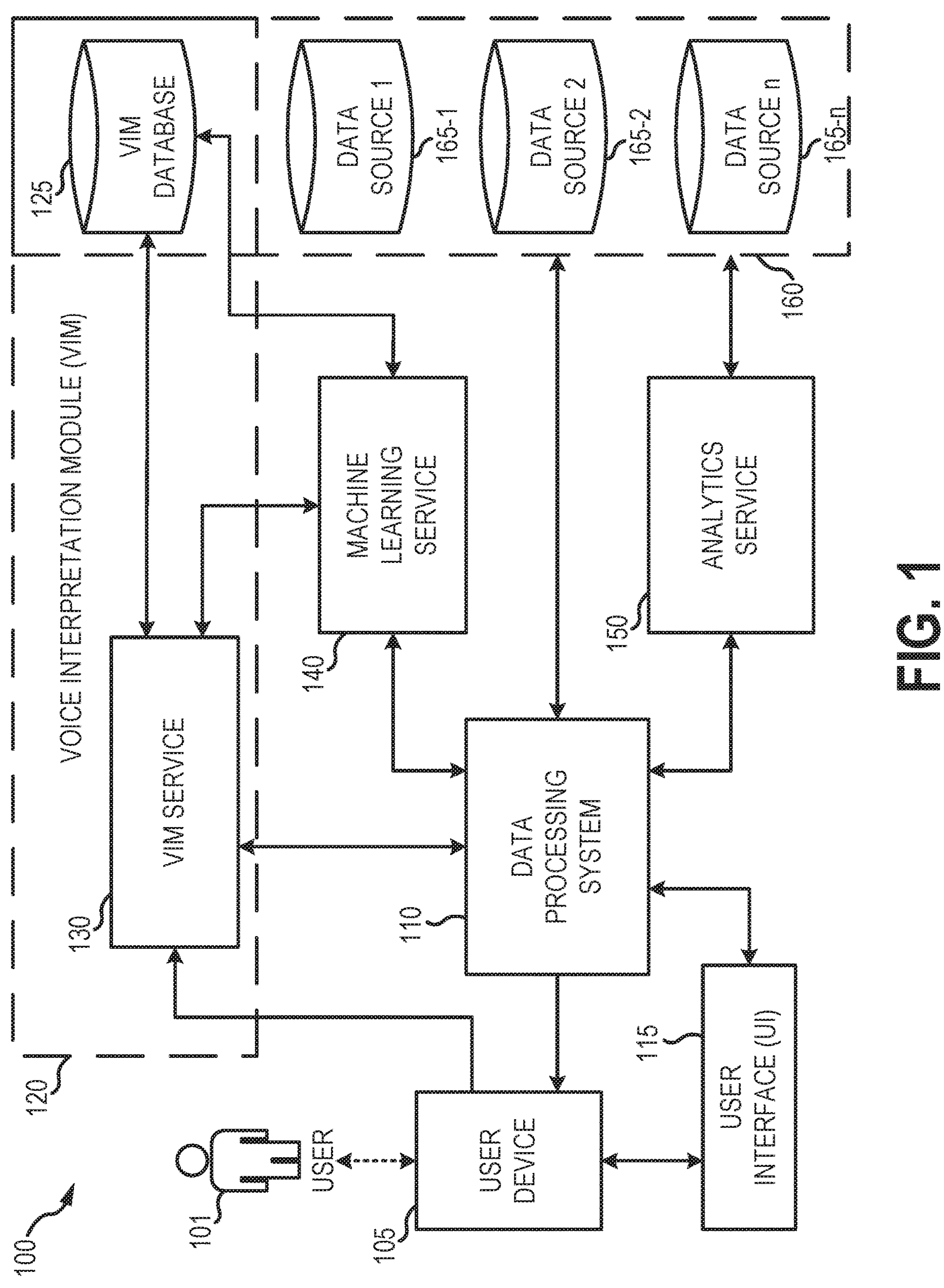
FIG. 1 is a block diagram illustrating various system components of a data processing system, in accordance with various embodiments.

In various embodiments, and with reference to FIG. 1, a data processing system 100 is disclosed. System may comprise one or more user devices 105, data processing systems 110, voice interpretation modules (VIM) 120, machine learning services 140, analytics services 150, and/or data sources 160. System 100 may also contemplate uses in association with web services, utility computing, pervasive and individualized computing security and identity solutions, autonomic computing, cloud computing, commodity computing, mobility and wireless solutions, open source, biometrics, grid computing, and/or mesh computing.

In various embodiments, a user 101 may access user device 105 to interact with system 100 and/or submit various data processing requests. The data processing requests may comprise commands to interact with one or more data sources 160, as discussed further herein.

Data sources 160 may comprise one or more sources of data, and each source of data main store and maintain any desired type of data. For example, data sources 160 may comprise a VIM database 125, a first-data-source 165-1, a second data source 165-2, an "Nth" data source **165-*n*, or the like. Each data source 165 may be in one or more logical and/or virtual data environments, servers, databases, processing platforms, or the like. One or more data source 165 may comprise different data formats and structures, and require different querying languages in order to be interacted with. For example, a first data source 165-1 may comprise a table, a second data source 165-2 may comprise a CSV file, an Nth data source 165-*n* may, comprise a data processing platform (e.g., a HADOOP® cluster), and/or the like. In one exemplary practical application, and in accordance with various embodiments, one or more of the data sources 165-2** may comprise a sources of financial and/or transaction data, including, for example, transaction account holder data, accounts receivable data, merchant data, and/or the like.

User device 105 may be in electronic communication with data processing system 110, a user interface (UI) 115, and/or VIM 120. User device 105 may comprise any suitable hardware, software, and/or database components capable of sending, receiving, and storing data. For example, user device 105 may comprise a personal computer, personal digital assistant, cellular phone, smartphone (e.g., IPHONE®, BLACKBERRY®, and/or the like), IoT device, kiosk, and/or the like. User device 105 may comprise an operating system, such as, for example, a WINDOWS® mobile operating system, an ANDROID® operating system, APPLE® IOS®, a BLACKBERRY® operating system, a LINUX® operating system, and the like. User device 105 may comprise hardware and/or software components configured to detect and ingest the audio transaction signal, such as, for example, a microphone or any other suitable audio recording component. User device 105 may also comprise software components installed on user device 105 and configured to allow user 101, via user device 105, access to various system 100 components. User device 105 may comprise a microphone and/or any other suitable audio listening or recording component capable of recording, streaming, and/or transmitting a user 101 voice input.

User device 105 may comprise a web browser (e.g., MICROSOFT INTERNET EXPLORER®, GOOGLE CHROME®, etc.), an application, a micro-app or mobile application, or the like, configured to allow user 101 to access and interact with data processing system 110 (e.g., directly or via UI 115, as discussed further herein).

Data processing system 110 may be in electronic communication with user device 105 (e.g., directly or via UI 115), VIM 120, machine learning service 140, analytics service 150, and/or data sources 160. Data processing system 110 may be configured to receive data processing requests, execute the data processing requests using the specified data sources 160, and generate data processing outputs based on the executing, as discussed further herein. Data processing system 110 may comprise one or more hardware, and/or database components. For example, data processing system 111) may comprise one or more network environments, servers, computer-based systems, processors, databases, and/or the like. Data processing system 110 may comprise at least one computing device in the form of a computer or processor, or a set of computers/processors, although other types of computing units or systems may be used such as, for example, a server, web server, pooled servers, or the like. Data processing system 110 may also include software, such as services, APIs, and the like, configured to perform various operations discussed herein. In various embodiments, data processing system 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

VIM 120 may be in electronic communication with user device 105, data processing system 110, and/or machine learning service 140. VIM 120 may be configured to perform various audio-enabled operations in system 100, including registering user 101 for audio-enabled data requests, authenticating and authorizing user based on audio-enabled login requests, receive audio-enabled data processing requests, process the audio-enabled data processing requests, and/or the like, as discussed further herein. VIM 120 may comprise one or more hardware, software, and/or database components. For example, VIM 120 may comprise one or more network environments, servers, computer-based systems, processors, databases, and/or the like. VIM 120 may comprise at least one computing device in the form of a computer or processor, or a set of computers/processors, although other types of computing units or systems may be used such as, for example, a server, web server, pooled servers, or the like. VIM 120 may also include software, such as services, APIS, and the like, configured to perform various operations discussed herein. In various embodiments VIM 120 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, VIM 120 may comprise or integrate with one or more smart digital assistant technologies. For example, exemplary smart digital assistant technologies may include the ALEXA® system developed by the AMAZON® company, the GOOGLE HOME® system, developed by Alphabet, Inc., the HOMEPOD® system of the APPLE® company, and/or similar digital assistant technologies. The ALEXA® system, GOOGLE HOME® system, and HOMEPOD®system, may each provide cloud-based voice activation services that can generally assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME®system, and HOMEPOD® system may receive voice commands via its voice activation technology, activate other functions, control smart devices, and/or gather information. For example, e smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news.

VIM 120 may comprise a VIM service 130 and/or VIM database 125. VIM database 125 may comprise any suitable database or data structure, and may be configured to store and maintain user login data, as discussed further herein. VIM database 125 may also comprise a voice dictionary including words and phrases of known actions, objects, visual outputs, and the like found in data processing requests, or known to be associated with technical words or phrases used in data processing requests (e.g., "show" may be associated with "navigate" or "display").

Figure 2A:
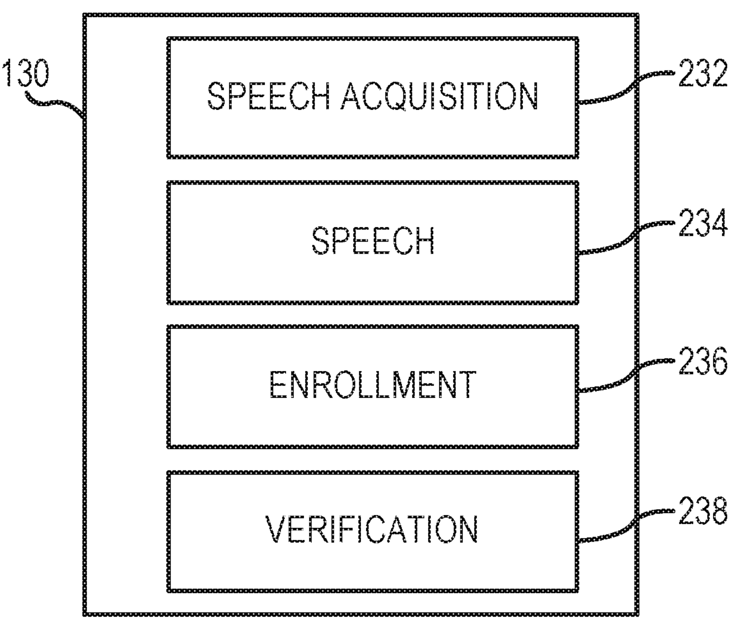
FIG. 2A is a block diagram illustrating various components of an exemplary voice interpretation module (VIM) service for a data processing system, in accordance with various embodiments.
Figure 2B:
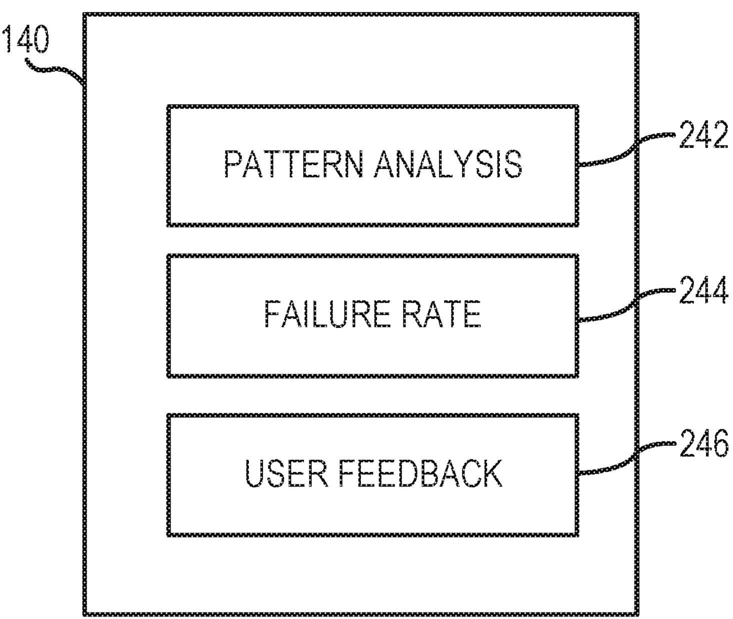
FIG. 2B is a block diagram illustrating various components of an exemplary machine learning service or a data processing system, in accordance with various embodiments.

VIM service 130 may be configured to receive and process various voice inputs from user 101. In various embodiments, VIM service 130 may comprise one or more software, hardware, and/or database components configured to aid in performing audio recognition, parsing, and translation processes in system 100. For example, and with reference to FIG. 2A, VIM service 130 may comprise a speech acquisition services 232, a speech services 234, an enrollment services 236, and/or a verification services 238. In various embodiments, VIM service 130 may comprise any other services, engines, or the like configured to aid VIM service 130 in interacting with components of system 100, such as, for example, a database access service, or the like.

Speech acquisition services 232 may be configured to receive one or more audio-enabled inputs from user device 105. For example, speech acquisition services 232 may be configured to receive an audio registration request, an audio login request, an audio data processing request, and/or the like.

Speech services 234 be configured to perform various processing operations on audio inputs received from user 101 (via user device 105). For example, speech services 234 may be configured to process audio inputs Using any suitable technique, software, or algorithm. Speech services 234 may also be configured to parse audio inputs to separate the audio input into ingestible and logical subparts, as discussed further herein.

Enrollment services 236 may be configured to enroll one or more users for audio-enabled data, processing operations. For example, enrollment module may be configured to allow user 101 to complete a registration process to register for audio-enabled data processing requests (or user interface-enabled data processing requests), as discussed further herein. The registration process may prompt user 101 to transmit one or more phrases such that speech services 234 may capture the user's voice characteristics. The registration process may also comprise prompting User 101 to grant microphone or listening rights to user device 105. The captured registration data may be stored as login data by VIM database 125. The stored login data mays be associated with a username, user ID, or the like of the user 101.

Verification Services 238 may be configured to pat form various user authentication and authorization processes. For example, verification services 238 may be configured to match processed audio login requests from user 101 against stored login data to authenticate and authorize user 101 for performing audio-enabled data processing operations. Verification services 238 may retrieve the stored login data from VIM database 125.

With reference again to FIG. 1, machine learning service 140 may be in electronic communication with VIM database 125, VIM service 130, and/or data processing system 110. Machine learning service 140 may comprise one or more hardware, software, and/or database components. For example, machine learning service 140 may comprise one or more network environments, servers, computer-based systems, processors, databases, and/or the like. Machine learning service 140 may comprise at least one computing device in the form of a computer or processor, or a set of computers/processors, although other types of computing units or systems may be used such as, for example, server, web server, pooled servers, or the like. Machine learning service 140 may also include software, such as services, APIs, and the like, configured to perform various operations discussed herein. In various embodiments, machine learning service 140 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, machine learning service 140 may implement various artificial intelligence, machine learning, and/or statistical analysis techniques to aid in various calculations and operations discuss herein. Artificial intelligence may refer generally to the study of agents (e.g., machines, computer-based systems, etc.) that perceive the world around them, form plans, and make decisions to achieve their goals. Foundations of AI include mathematics, logic, philosophy; probability, linguistics, neuroscience, and decision theory. Many fields fall under the umbrella of AI, such as computer vision, robotics, machine learning, and natural language processing. For example, and in accordance with various embodiments, machine learning service 140 may implement machine learning algorithms and models to aid in translating audio-enabled data processing requests into technical requests that can be executed in data processing system 110.

Machine learning service 140 may implement any suitable machine learning model or algorithm, statistical data model, or the like, and may be supervised or unsupervised. For example, exemplary unsupervised models may include clustering and dimensionality reduction, LDA topic modeling, and/or any other unsupervised machine learning model. For example, exemplary supervised models may include classification models, regression models, sentiment analysis techniques, and/or any other supervised machine learning model. The machine learning model may be trained to aid in identifying and translating words from the audio-enabled data processing request. In various embodiments, machine learning networks and/or subject matter experts may initially supervise the model. In various embodiments, the machine learning model may comprise random forest models, gradient boosting models, or any other suitable or desired model. In various embodiments, machine learning service 140 may also implement reinforcement learning techniques to enhance the machine learning algorithm and/or statistical data models.

In various embodiments, machine learning service 140 may comprise one or more software, hardware, and/or database components configured to aid in performing machine learning and/or statistical services in system 100. For example, and with reference to 2B, machine learning service 140 may comprise a pattern analysis module 242, a failure rate module 244, and/or a user feedback module 246. Pattern analysis module 242 may be configured to gather data regarding users 101 that initially enrolled in audio-enabled data processing requests, but then no longer used the audio-enabled requests. In that respect, pattern analysis module 242 may be configured to determine a pattern of users 101 that Cease wing audio-enabled features of system 100. Failure rate module 244 may be configured to gather data regarding audio data processing requests that were incorrectly translated, or failed to translate that regard, failure rate module 244 may, gather data associated with the rate of failures in audio data processing requests received in system 100. User feedback module 246 may be configured to gather data received from users 101 after submitting audio data processing requests (e.g., via surveys, chats, etc.). For example, user feedback module 246 may gather data regarding whether the audio data processing request was properly translated; properly executed, and/or the like.

Each of the machine learning service 140 components may be configured to improve audio recognition capabilities in VIM 120. For example, data from each of the components may be fed into one or more machine learning models in machine learning service 140 to farther improve the recognition and translation of words from audio-enabled data processing requests.

With reference again to FIG. 1, analytics service 150 may be in electronic communication with data processing system 110 and/or one or more data sources 160. Analytics service 150 may comprise one or more hardware, software, and/or database components. For example, analytics service 150 may comprise one or more network environments, servers, computer-based systems, processors, databases, and/or the like. Analytics service 150 may comprise at least one computing device in the form of a computer or processor, or a set of computers/processors, although other types of computing units or systems may be used such as, for example, a server, web server, pooled servers, or the like. Analytics service 150 may also include software, such as services, APIs, and the like, configured to perform various operations discussed herein. In various embodiments, analytics service 150 may include one or more processors and/or one or more tangible, non-transitory memories and be capable of implementing logic. The processor may be configured to implement various logical operations in response to execution of instructions, for example, instructions stored on a non-transitory, tangible, computer readable medium, as discussed further herein.

Figure 2C:
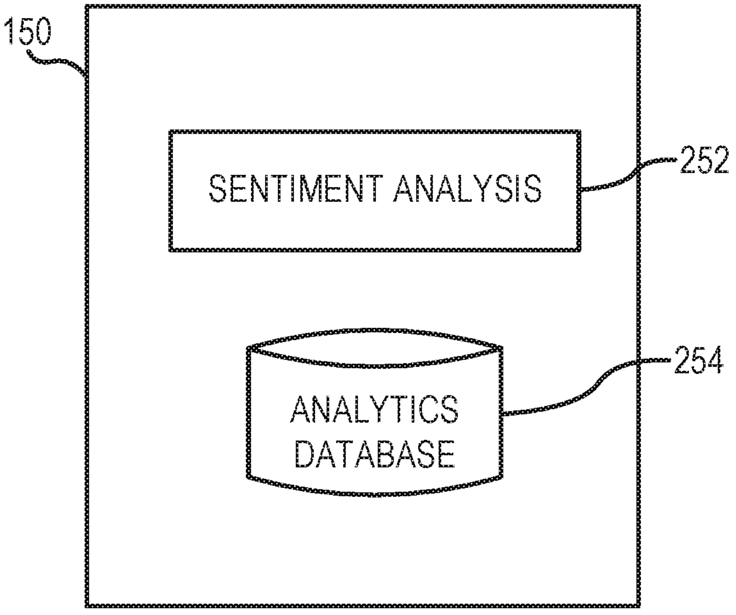
FIG. 2C is a block diagram illustrating various components of an exemplary analytics service for a data processing system, in accordance with various embodiments.

In various embodiments, analytics service 150 may comprise one or more software, hardware, and/or database components configured to aid in performing analytic services in system 100. For example, and with reference to FIG. 2C, analytics service 150 may comprise a sentiment analysis module 252 and/or an analytics database 254.

Sentiment analysis module 252 may be configured to gather user sentiment data after an audio-enabled data processing operation has been completed. For example, sentiment analysis module 252 may comprise a chatbot. The chatbot may engage the user 101, via user device 105, with questions or prompts regarding the process. For example, the chatbot may prompt the user 101 to rate the experience or satisfaction, whether the data processing output was what the user 101 wanted, and/or the like. In various embodiments, analytics service 150 may also transmit or display a survey to user 101, via user device 105 and/or UI 115. The survey may prompt user 101 to answer similar sentiment-based questions about the data processing.

Sentiment analysis module 252 may implement natural language processing (NLP) and sentiment analysis techniques on the chatbot data and survey data to determine the sentiment of the user 101. For example, sentiment analysis module 252 may implement topic modelling techniques such as, for example, latent Dirichlet allocation (LDA), correlated topic modeling, or the like. As a further example, sentiment analysis module 252 may implement text processing algorithms, such as word2vec and/or any other suitable word embedding process. In various embodiments, sentiment analysis module 252 may also implement various text analysis processes such as, for example, word frequency analysis tools, phrase frequency analysis tools, and/or any other suitable text mining algorithm, tool, or the like. Sentiment analysis module 252 may feed the sentiment data to machine learning service 140, via user feedback module 246, for processing.

Analytics database 254 may comprise any suitable database or structure capable of storing and maintaining data. Analytics database 254 may store and maintain processing rankings and associated processing data corresponding to data processing requests previously executed by data processing system 110, as discussed further herein.

Figure 3:
FIG. 3 illustrates a process flow for a method of transmitting a data processing request, in accordance with various embodiments.
Figure 3:
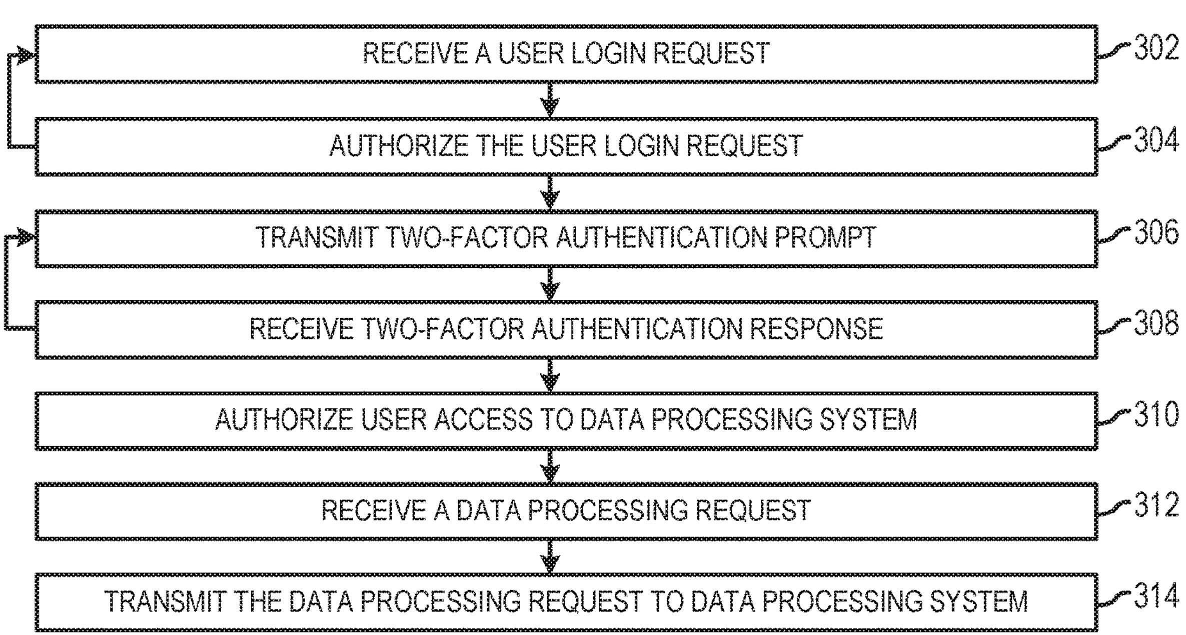
Figure 4:
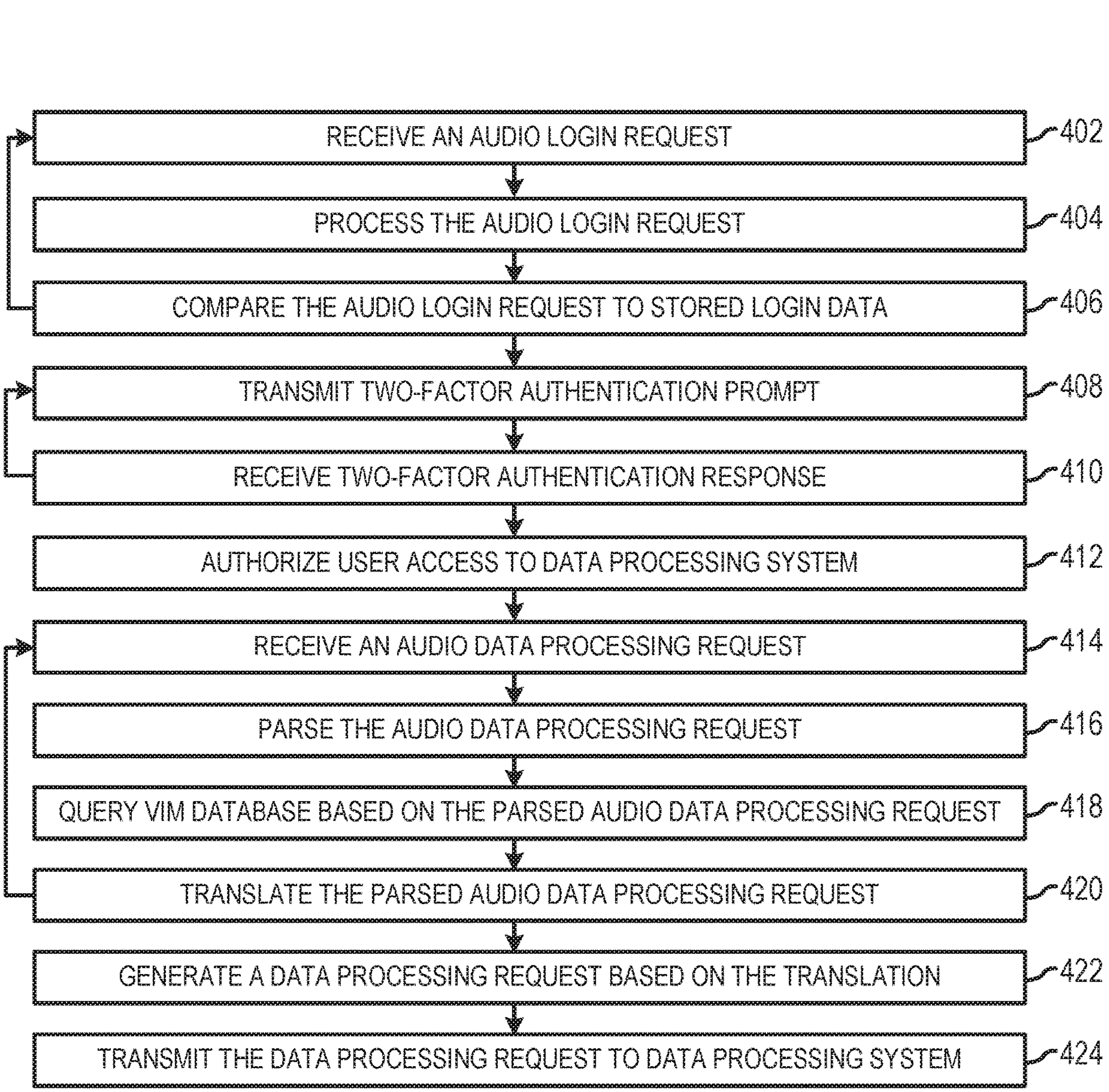
FIG. 4 illustrates a process flow for a method of transmitting an audio-enabled data processing request, in accordance with various embodiments.
Figure 5:
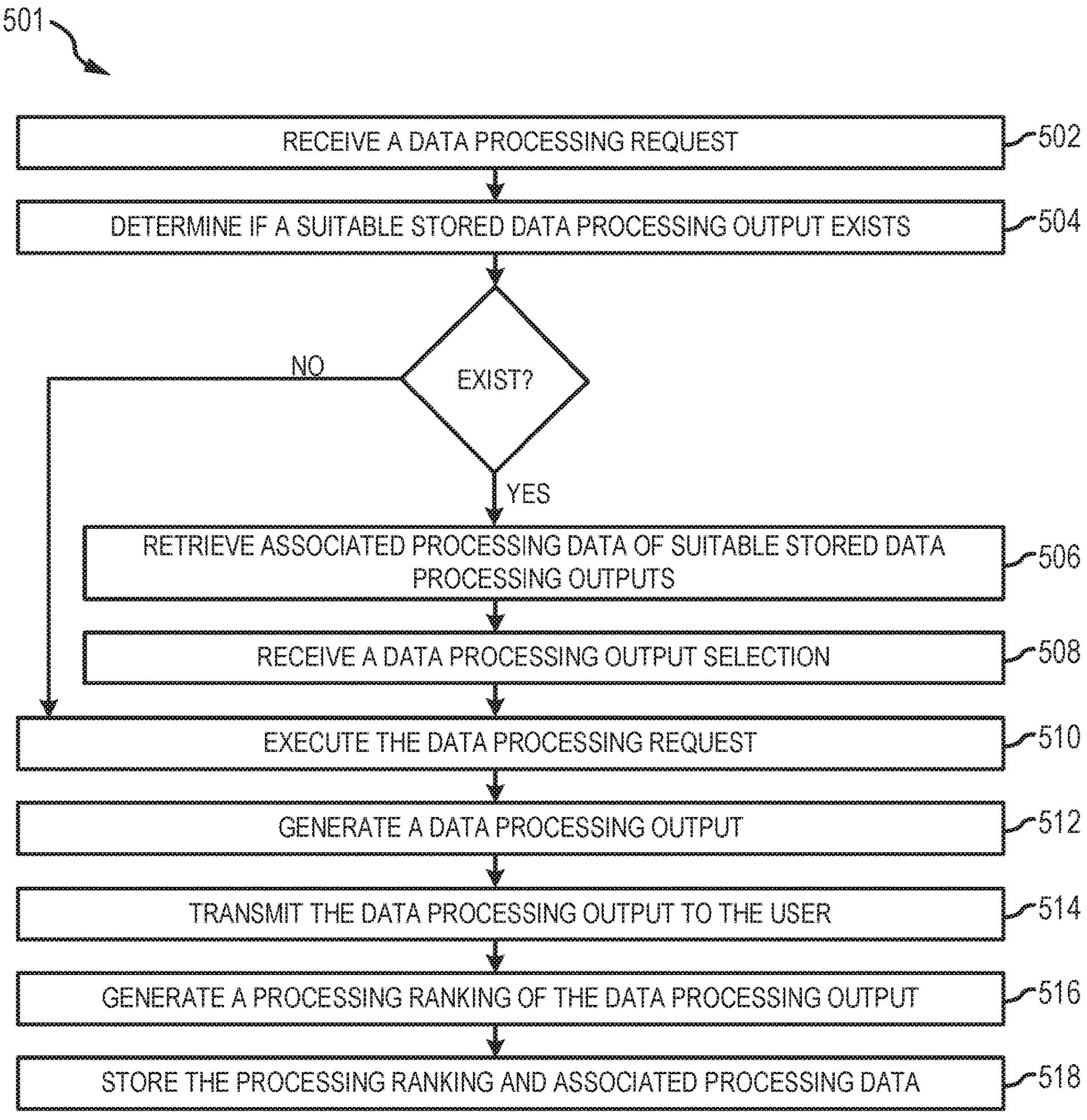
FIG. 5 illustrates a process flow for a method of executing a data processing request, in accordance with various embodiments.

Referring now to FIGS. 3-5 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-5, but also to the various system components as described above with reference to FIGS. 1 and 2A-2C. It should be understood at the outset that, although exemplary embodiments are illustrated in the figures and described below the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With specific reference to FIG. 3, a method 301 for transmitting a data processing request is disclosed. In various embodiments, method 301 may enable a user to transmit a data processing request via a user interface-based input source (e.g., UI-based input source). For example, a user may transmit the data processing request via user interface (UI) 115. The user may input the data processing-request via any suitable means, such as, for example, through a text input, user navigation, gesture, and/or the like.

User 101 may access UI 115, via user device 105, to begin the process of transmitting a data processing request. In response to accessing UI 115, UI 115 may prompt user 101 to register for the service or login to the service. The prompt may include, for example, a username and password entry, a biometric input, an audio enabled login (e.g., as discussed further herein with reference to FIG. 4), and/or the like. Method 301 may include receiving a user login request (step 302). The user login request may comprise user credentials entered by user 101 into UI 115, via user device 105. For example, the user login request may comprise a username, a password, a biometric input fingerprint, facial-recognition, etc.), or the like.

Method 301 may include authorizing the user login request (step 304). For example data processing system 110 may store and Maintain user credentials (e.g., stored from a user registration). In response to receiving the user login request, via UI 115, data processing system 110 may compare received user credentials against the stored user credentials to authorize the user login request.

Method 301 may include transmitting a two-factor authentication prompt (step 306). For example, in response to authorizing the user login request, data processing system 110 may transmit the two-factor authentication prompt to user device 105 (e.g., directly or displayed via UI 115). The two-factor authentication prompt may comprise an additional security prompt to verify and authorize the user 101. For example, the stored user credentials may comprise a phone number, email address, or the like associated with user 101. The two-factor authentication prompt may be transmitted to the user 101 via a push notification, email, SMS or MMS message, or through any other suitable communications channel. The two factor authentication prompt may comprise a security code and/or any other-suitable security means, for user 101 to input into UI 115.

Method 301 may include receiving a two-factor authentication response (step 308). For example, the user 101 may input the two-factor authentication response into UI 115, via user device 115, in response to receiving the two-factor authentication prompt. Data processing system 110 may compare the two-factor authentication response to the two-factor authentication prompt to verify and authentication the user 101. In response to being unable to authenticate the user 101 (e.g., the two-factor authentication response does not match the two-factor authentication prompt), data processing system 110, via UI 115, may prompt user 101 to reinput two-factor authentication response or to request a new two-factor authentication prompt.

In response to authenticating the user 101, method 301 may include authorizing user access to data processing system 110 (step 310). For example, the stored user credentials mays comprise security credentials authorizing the associated user 101 to performing certain tasks and access certain data sources 160. In various embodiments, VIM service 130 and/or data processing system 110 may generate a single sign-on (SSO) token, or any other suitable security token, and transmit the token to user device 105. The token may comprise data, indicating the tasks and data sources 160 that user 101 is authorized to interact with (e.g., user 101 is authorized to read data from first data source 165-1, read/write data from second data source 165-2, and is not authorized to access Nth data source **165-*n***, etc.).

In response to user 101 receiving authorization to access data processing system 110, user 101 may interact with UI 115 to perform to various data processing tasks in data processing system 110. Method 301 may include receiving a data processing request (step 312). The data processing request may comprise a technical query configured to interact with one or more data sources 160. In various embodiments, the data processing request may also comprise an algorithm, a navigation command, a menu change command, an action output, and/or the like. The data processing request may comprise suitable query language and/or request structure. The data processing request may comprise one or more actions to be performed on a specified dataset or data source, together with specified visual output. For example, an action may comprise "select," "create," "run," "execute," "display," "navigate," and/or any other suitable action. One or more actions may also have an associated type. For example, an action of "regression" may have a type of "binomial" (e.g., a binomial regression). The action may be coupled with an object to form a query pattern. For example, a query pattern may comprise "select dataset 1," "binomial regression, variable=dataset 2" and/or the like. The data processing request may comprise any number of query patterns. The visual output may specify the visual tool used to display the query, such as, for example MICROSOFT EXCEL®, TABLEAU®available from TABLEAU SOFTWARE®, QLIKVIEW® or QLIK SENSE® available from QLIK®, DATAMEER®, and/or any other suitable or desired visual display tool. Method 301 may include transmitting the data processing request to data processing system 110 (step 314). UI 115 may receive the data processing request from user device 105, and may transmit the data processing request to data processing system 110 for execution (e.g., as discussed further herein with reference to FIG. 5).

In various embodiments, the data processing request entered into UI 115 may comprise non-technical data processing request (e.g. similar to a non-technical audio-enabled data processing request, as discussed further with reference to FIG. 4). In that respect, method 301 may comprise additional steps to parse the non-technical data processing request (e.g., step 416, with reference to FIG. 4); query a text database (e.g., VIM database 125) to determine commands, words, and phrases from the non-technical data processing request (e.g., step 418 with reference to FIG. 4); translate the non-technical data processing request into a (technical) data processing request (e.g., step 420, with reference to FIG. 4); and/or generate the (technical) data processing request (e.g., step 422, with reference to FIG. 4). Method 301 may therefore enable the translation of data processing requests input into UI 115 in a similar manner as audio-enabled data processing requests input via VIM 120.

With specific reference to FIG. 4, a method 401 for transmitting an audio enabled data processing request is disclosed. User 101 may access user interface (UI) 115, via user device 105, to begin the process of transmitting a data processing request. In response to accessing UI 115, UI 115 may prompt user 101 to register for the service or login to the service. The prompt may include, for example, a username and password entry, a biometric input, an audio enabled login, and/or the like. Method 401 may include receiving an audio login request (step 402). The audio login request may comprise a voice transmission input by user 101 via user device 105 (e.g., by speaking into a listening device in the user device 105). The audio login request may comprise one or more words or phrases configured to authenticate the user 101.

For example, and in accordance with various embodiments, the audio login request may comprise an activation word, an authentication word, and/or one or more voice characteristics. The activation word may comprise a word or phrase to signal that user 101 is inputting the audio login request. For example, the activation word may comprise, "Hey VIM," "Hey Voice Interpretation Module," "Hey Siri," "Hey Google," "Log me in," and/or any other suitable or desired activation word. The authentication word may comprise a word or phrase that either alone, or together with one or more voice characteristics, is used to authenticate the user 101. For example, the authentication word may comprise the users name (e.g. "John Smith." "jsmith," etc.), a passphrase (e.g., "Hello," "Secret Code 123," etc.), and/or any other suitable or desired authentication word associated with the user 101. The voice characteristics may comprise characteristics of the user's speech, such as, for example voice tonality. User device 105 may transmit the audio login request to VIM service 130.

Method 401 may include processing the audio login request (step 404). VIM service 130, via speech services 234, may be configured to process the audio login request in response to receiving the audio login request from user device 105 (e.g., via speech acquisition services 232). VIM service 130 may process the audio login request using any suitable technique, software, or algorithm. For example, VIM service 130 may process the audio login request to identify the activation word, the authentication word, and/or one or more of the users voice characteristics. In various embodiments, in response to VIM service 130 being unable to process the audio login request (or being unable to capture the audio login request), VIM service 130 may instruct data processing system 110, via UI 115, to prompt user 101 to input the audio login request again.

Method 401 may include comparing the audio login request to stored login data (step 406). For example, user 101 may previously register with VIM 120, via enrollment services 236 of VIM service 130. The registration process may comprise user 101 registering for access to data processing system 110 (e.g., via a standard username, password, biometric input, etc.) and/or registering for audio-enabled data processing request. The registration process may include prompting user 101 to audibly transmit one or more phrases such that VIM service 130 may capture the users voice characteristics. The registration process may also include prompting the user to select an authentication word, and to audibly transmit the authentication word one or more times such that VIM service 130 may capture the authentication word. In various embodiments, VIM service 130 may also prompt user 101 to select an activation word. VIM service 130 may also notify the user 101 of the activation word to use. In various embodiments, the registration process may also comprise prompting user 101 to want microphone or listening rights to user device 105. The captured registration data may be stored as login data by VIM service 130 in VIM database 125. The stored login data may be associated with a username, user ID, or the like of the user 101.

In response to receiving and processing the audio login request, VIM service 130, via verification services 238, may query VIM database 125 to determine whether at least one of the authentication word or the user voice characteristics match stored login data. In response to locating a match, VIM service 130 may authorize the audio login request. In response to being unable to locate a match, VIM service 130 may instruct data processing system 110, via UI 115, to prompt user 101 to reinput the audio login request or proceed with a first time registration.

Method 401 may include transmitting a two-factor authentication prompt (step 408). For example, in response to authorizing the audio login request, VIM service 130 may instruct data processing system 110 to transmit the two-factor authentication prompt to user device 105 (e.g., directly or displayed via UI 115). The two-factor authentication prompt may comprise an additional security prompt to verify and authorize the user 101. For example, the stored user credentials may comprise a phone number, email address, or the like associated with user 101. The two-factor authentication prompt may be transmitted to the user 101 via a push notification, email, SMS or MMS message, or through any other suitable communications channel. The two-factor authentication prompt may comprise a security code and/or any other suitable security means, for user 101 to input into UI 115. Method 401 may include receiving a two-factor authentication response (step 410). For example, the user 101 may input the two-factor authentication response into UT 115, via user device 105, in response to receiving the two-factor authentication prompt. Data processing system 110 may compare the two-factor authentication response to the two-factor authentication prompt to verify and authentication the user 101. In response to being unable to authenticate the user 101 (e.g., the two-factor authentication response does not match the two-factor authentication prompt), data processing system 110, via UI 115, may prompt user 101 to reinput the two-factor authentication response or to request a new two-factor authentication prompt.

In various embodiments, the two-factor authentication response may be input by the user using any suitable transmission means, such as, for example, an audio-based response, a UI-based response (e.g., text, navigation, gesture, etc.), and/or the like.

Method 401 may include authorizing user access to data processing system 110 (step 412). For example, the stored user credentials may comprise security credentials authorizing the associated user 101 to perform certain tasks and access certain data sources 160. In various embodiments, data processing system 110 may generate a single sign-on (SSO) token, or any other suitable security token, and transmit the token to user device 105. The token may comprise data indicating the tasks and data sources 160 that user 101 is authorized to interact with (e.g., user 101 is authorized to read data from first data source 165-1, read/write data from second data source 165-2, and is unable to access Nth data source 165-*n*, etc.).

In response to user 101 receiving authorization to access data processing system 110, user 101 may interact with data processing system (e.g., via UI 115 or audibly via VIM 120) to various data processing tasks. Method 401 may include receiving an audio data processing request (step 414). The audio data processing request may comprise a voice transmission input by user 101 via user device 105 (e.g., by speaking into a listening device in the user device 105). The audio data processing request may comprise the activation word and the processing request. The processing request may comprise a technical processing request (e.g., recited correctly in a query language) and/or a plain language processing request (e.g., not recited in accordance with a query language). For example, an audio data processing request mays comprise "Hey VIM, show me the latest data source 1 dashboard." As a further example, an audio data processing request may comprise "Hey Siri, select dataset ABC from data source 2, create a subset with Client ID, DBB, and DR, run a binomial regression model using Client ID as the observation variable, and visualize the model output using QLIK®." In that regard, the audio data processing request may comprise a simple or complex query or data processing action, and may include a technical request, a plain language processing request, or any combination thereof. The audio data processing request may comprise the various actions, data objects, visual outputs, and the like that the user 101 desires from an executed request. User device 105 may transmit the audio data processing request to VIM service 130, via speech acquisition services 232.

Method 401 may include parsing the audio data processing request (step 416). VIM service 130, via, speech services 234, may be configured to parse the audio data processing request into one or more subparts (e.g., separate each processing request). For example, given the example audio data processing request of "Hey VIM, show me the latest data source 1 dashboard," VIM service 130 may parse the audio data processing request into the activation word ("Hey VIM") and the processing request ("show me the latest data source 1 dashboard"). As a further example, given the example audio data processing request of "Hey Siri, select dataset ABC from data source 2, create a subset with Client ID, DBB, and DR, run a binomial regression model using Client ID as the observation variable, and visualize the model output using QLIK®," VIM service 130 may parse the audio data processing request into the activation word ("Hey Siri") a first processing request ("select dataset ABC from data source 2"), a second processing request ("create, a subset with Client ID, DBB, and DR"), a third processing request ("run a binomial regression model using Client ID as the observation variable"), and/or a fourth processing request ("visualize the model output using QLIK®").

In response to parsing the audio data processing request, method 401 may include querying VIM database 125 based on the parsed audio data processing request (step 418). VIM database 125 may comprise a voice dictionary including words and phrases of known actions, objects, visual outputs, and the like found in data processing requests, or known to be associated with technical words or phrases used in data processing requests (e.g., "show" may be associated with "navigate" or "display"). In various embodiments the voice dictionary may be updated over time by machine learning service 140 in response to machine learning service 140 learning new words and phrases used in data processing requests. VIM service 130, via speech services 234, may query VIM database 125 based on each processing request to locate words or phrases at least partially matching a word or phrase in the processing request. For example, given the example processing request of "show me the latest data source 1 dashboard," VIM service 130 may query VIM database 125 to locate "show," "latest," "data source 1," and/or "dashboard."

In response to VIM service 130 being unable to locate a word or phrase, VIM service 130 may transmit the unknown word or phrase to machine learning service 140, via pattern analysis module 242. Machine learning service 140 (via pattern analysis module 242) may leverage machine learning algorithms and models to improve the audio-enabled matching, and to recognize similar audio-input patterns based on historical learnings by the machine learning algorithms and/or models.

In response to locating each word, method 401 may include translating the parsed audio data processing request (step 420). For example, the stored words or phrases in VIM database 125 may be associated with a technical query word or phrase, such as, for example, an action, an object, a visual output, or the like. For example, given the example processing request of "show me the latest data source 1 dashboard," VIM service 130 may query VIM database 125 to locate "show" and determine that "show" translates to "navigate", locate "latest" and determine that "latest" translates to "current month," "today," or the like; locate "data source 1" as being the contextual object to navigate to; locate "dashboard" and determine that "dashboard" is the visual display the user desires; and/or the like. In various embodiments, in response to being unable to translate the parsed audio data processing request, VIM service 130 may instruct data processing system, via UI 115, to prompt user 101 to reinput the audio data processing request.

In response to translating the parsed audio data processing request, method 401 may include generating a data processing request, based on the translation (step 422). VIM service 130, via speech services 234, may generate the data processing request to comprise each translated word or phrases such that the data processing request comprises a technical request capable of being executed to interact with the specified data sources 130. In various embodiments, VIM service 130 may transmit the generated data processing request to UI 115, via data processing system 110, to prompt the user whether the generated data processing request is accurate. Method 401 may include transmitting the data processing request to data processing system 110 (step 424). VIM service 130 may transmit the data processing request to data processing system 110 for execution (e.g., as discussed further herein reference to FIG. 5).

With specific reference to FIG. 5 a method 501 for executing a data processing request is disclosed. Method 501 may include receiving a data processing request (step 502). Data processing system 110 may receive the data processing request from UI 115 (e.g., step 314; with reference to FIG. 3) or VIM service 130 (e.g., step 424, with reference to FIG. 4).

Method 501 may include determining if a suitable stored data processing output exists (step 504). Analytics database 254 in analytics service 150 may store and maintain processing ranking and associated processing data corresponding to data processing requests previously executed by data processing system 110. The associated processing data may comprise data corresponding to the data processing request executed to complete the output. For example, the associated processing data comprise the query, the data sources and/or datasets involved in the query, the type of query, and/or the like. The processing ranking may comprise a rank of one or more similar suitable stored data processing outputs (e.g., 1, 2, 3; A, B, C; etc.) The processing ranking may be based on one or more efficiency metrics such as, for example, the execution time of the request, processing usages, and/or the like. In various embodiments, the efficiency metrics may also comprise the volume of request processing output; the size of the processing output, the timeframe of similar processing output (e.g., similar processing outputs requested recently maybe more relevant that similar processing outputs requested years before), the data source or domain of the processing output, the user acceptance level of the processing output (e.g., technology used, user sentiment, data quality, data coverage, data extensibility, etc.), and/or any other suitable or desired efficiency metric. In that respect, and as discussed further herein, the processing ranking may comprise a rank of data processing requests previously executed in the system that are similar to the received data processing request. In various embodiments the rank of data processing requests may be established based on the efficiency metrics, such as, for example, by averaging and/or weighted various factors (as desired) to produce a ranking of the similar received data processing requests. Data processing system 110 may query analytics database 254 to determine whether one or more previously executed data processing requests were similar to the received data processing request. Similarity of processing requests may be determined based on the associated processing data, such as the query, the data sources and/or datasets involved in the query, the type of query, and/or the like. In that regard, data processing system 110 may locate suitable previously executed data processing requests to reduce redundant execution of data processing requests and the creation of duplicate data in the system (e.g., in contrast to typical data processing systems).

In response to determining that a suitable stored data processing output exists, method 501 may include retrieving associated processing data of suitable stored data processing outputs (step 506). For example, data processing system 110 may retrieve from analytics database 254 the processing ranking, the efficiency metrics, the type of query, the data sources and/or datasets involved in the query, and/or the like, for each stored data processing output determined to be similar to the data processing request. Data processing system 110 may display or transmit associated processing data to user 101 (e.g., via UI 115 and/or user device 105).

Method 501 may include receiving a data processing output selection (step 508) based on the associated processing data (step 508). In response to receiving the associated processing data, user 101 may select to execute the original data processing request, or to execute or use one of the suitable stored data processing outputs. User device 105, and/or UI 115, may transmit the selected data processing output (e.g., the output underlining the query or request) to data processing system 110.

In response to determining that a suitable stored data processing output does not exist (step 504) or in response to receiving the data processing output selection (step 508), method 501 may include executing the data processing request (step 510). Data processing system 110 may execute the data processing request to interact with one or more of the data sources 160 (e.g., first data source 165-1, second data source 165-2, Nth data source **165-*n*, etc.). For example, data processing system 110 may execute each action specified in the data processing request, to retrieve or interact with data residing in one or more of data sources 160**.

Method 501 may include generating a data processing output (step 512), based on the executing the data processing request. Data processing system 110 may generate the data processing output in response to completing execution of the data processing request. The data processing output may comprise an output, a report, a visual display, a navigation, a data transformation, a data wrangling, and/or the like. In various embodiments, the data processing output may be output based on the visual output specified in the data processing request. Method 501 may include transmitting the data processing output to the user 101 (step 514). For example, and in accordance with various embodiments, data processing system 110 may display the data processing output to user 101 via UI 115. As a further example and in accordance with various embodiments, data processing system 110 may transmit the data processing output to user device 105; via an email, push notification, SMS or MMS message, or the like.

Method 501 may include generating a processing ranking of the data processing output (step 516). Analytics service 150 may generate the processing ranking based on the execution of the data processing output. For example, analytics service 150 may retrieve an event log, application log, or the like from data processing system 110 to determine the execution time of the data processing request, and the processing usages of the data processing request (e.g., CPU usage, memory usage, bandwidth usage, etc.).

Analytics service 150, via sentiment analysis module 252, may also determine the sentiment of the user 101 executing the data processing request (e.g., user feedback). For example, analytics service 150 may comprise a chatbot, and the chatbot may engage the user 101 with questions or prompts regarding the process. For example, the chatbot may prompt the user 101 to rate the experience or satisfaction, whether the data processing output was what the user 101 wanted, and/or the like. In various embodiments, analytics service 150 may also transmit or display a survey to user 101, via user device 105 and/or UI 115. The survey may prompt user 101 to answer similar sentiment-based questions about the data processing. In various embodiments, UI 115 may also be configured to collect sentiment data. For example, UI 115 may prompt (via UI 115 or VIM 120) the user with one or more questions regarding user experience. UI 115 may capture the responses and transmit the responses to analytics service 150.

Analytics service 150, via sentiment analysis module 252, may implement natural language processing (NLP) and sentiment analysis techniques on the chatbot data and survey data to determine the sentiment of the user 101. For example, analytics service 150, via sentiment analysis module 252, may implement topic modelling techniques such as, for example, latent Dirichlet allocation (LDA), correlated topic modeling, or the like. As a further example, analytics service 150, via sentiment analysis module 252, may implement text processing algorithms, such as word2vec and or any other suitable word embedding process. In various embodiments, analytics service 150, via sentiment analysis module 252, may also implement various text analysis processes such as, for example, word frequency analysis tools, phrase frequency analysis tools, and/or any other suitable text mining algorithm, tool, or the like.

Analytics service 150 may transmit the user feedback to machine learning service 140, via user feedback module 246. For example, the user feedback may be recorded, identified and/or classified, and recorded based on the identification or classification. For example, in response to the user feedback comprising negative feedback, feedback module 246 may identify the negativity through sentiment analysis, and categorize the feedback using topics such as "broken item," "associate with a data source," or the like. Feedback module 246 may further classify the occurrences of each request determine what the root causes of request success or failure may be.

Method 501 may include storing the processing ranking and associated processing data (step 518). Analytics service 150 may store the data in analytics database 254 for future data processing operations.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment" "an example embodiment," etc., indicate that the embodiment described may include a particular feature, structure, or characteristic, but every embodiment may not necessarily include the particular feature, structure, or characteristic. Moreover, such phrases are not-necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those easing 10BASE-T, 100BASE-T 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi) a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any, suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching to subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look up table or any other method or system for indicating, or creating a relationship between elements such as for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data financial institution data, and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g., data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT®Word™ or EXCEL®, an ADOBE® Portable Document Format (PDF) document, etc.), an "eBook" an "eMagazine," an application or microapplication (as described herein), an SMS or other type of text message; an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications is texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system may be implemented as micro-applications, micro-apps, micro-services, or the like. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application serer and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including URL and an IP address. The web server-retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications. In various embodiments, any communication discussed herein may be accomplished via the internet or an intranet. Communications may be completed using any suitable protocol, such as, for example, IPv4 (base 10), IPv6 (HMAC), and/or any other suitable or desired communications protocol.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems). In various embodiments, service solutions may also include IaaS environments, PaaS, environments, and/or the like.

Users, systems, computer-based systems or the like may communicate with the server via a web client. The web client includes any device or software which communicates via any network such as, for example any device or software discussed herein. The web client may include interact browsing software installed within a computing unit or system to conduct online transactions and/or communications. These computing units or systems may take the form of a computer or set of computers, although other types of computing units or systems may be used, including personal computers, laptops notebooks, tablets, smart phones, cellular phones, personal digital assistants, servers, pooled servers, mainframe computers, distributed computing clusters, kiosks, terminals, point of sale (FOS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. In various embodiments, any database may also include a no-SQL database, a key-value database, an in-memory database, a GPU database, and/or the like. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IOT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased. security at least partially due to the immutable nature of data, that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BAL- ANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database timing steps are contemplated to optimize database performance. For ample, frequently used files such as indexes may be placed on separate file systems to reduce In/Out ("I/O") bottlenecks.

More particularly, a "key field" partitions the database according to the the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files, using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB), data stored as ungrouped data elements encoded using ISO/IEC 7816-6 data elements; data stored a ungrouped data elements encoded using ISO/IEC Abstract Syntax Notation (ASN.1) as in ISO/IEC 8824 and 8825, other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in, managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set, e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the stand-alone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDHA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in Varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server; any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various, integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data, transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using a JAVASCRIPT® run-time environment configured to execute JAVASCRIPT® code outside of a web browser. For example, the software elements of the system may be implemented using NODE.JS® components. NODE.JS® programs may implement several modules to handle various core functionalities. For example, a package management module, such as NPM®, may be implemented as an open source library to aid in organizing the installation and management third-party NODE.JS® programs. NODE.JS® programs may also implement a process manager such as, for example, Parallel Multithreaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly, so stated, but rather "one or more." Moreover, where a phrase similar to 'at least one of A, B, and C' or 'at least one of A, B, or C' is used in the claims or specification; it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase “means for” or “step for.” As used herein, the terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

receiving, by a processor of a data processing system, an audio data processing request comprising a technical command to interact with one or more data sources of a data processing system;

translating, by the processor, the audio data processing request into a first data processing request in a database query language that is configured to interact with the one or more data sources of the data processing system;

querying a data source of the data processing system specified in the database query language of the first data processing request;

executing, by the processor, the first data processing request using the data source of the data processing system specified in the database query language of the first data processing request;

generating, by the processor, a data processing output based on the executing of the first data processing request by the data processing system;

storing, by the processor, the first data processing request and the data processing output in an analytics database;

generating, by the processor, a process ranking for the stored data processing output based on at least an execution time used to generate the stored data processing output by the data processing system;

obtaining, by the processor, a second data processing request;

determining, by the processor, the second data processing request to be similar to the first data processing request;

presenting, by the processor, a plurality of options for servicing the second data processing request, the plurality of options including an option of processing the second data processing request to generate a new data processing request output and an option to use the stored data processing output for the first data processing request;

transmitting for display, by the processor, processing data associated with the stored data processing output, wherein the processing data comprises an indication of at least a subset of a dataset or data source involved in the stored data processing output and the processing ranking for the stored data processing output;

receiving, by the processor, a data processing request selection comprising one of the plurality of options for servicing the second data processing request; and executing, by the processor, the data processing request selection on one or more data sources of the data processing system.

2. The method of claim 1, wherein the processing ranking is generated based on an efficiency metric associated with the execution time of the first data processing request and processing usage of the processor and memory while executing the first data processing request.

3. The method of claim 1, further comprising determining that the second data processing request at least partially matches the first data processing request by comparing at least one of a type of query, a query data source, or a query dataset.

4. The method of claim 1, wherein the audio data processing request is received from an audio-enabled input source.

5. The method of claim 1, wherein the audio data processing request is received from a user interface-based input source.

6. The method of claim 1, further comprising generating, by the processor, the new data processing request output based at least in part on executing the second data processing request.

7. The method of claim 1, wherein the audio data processing request comprises a plain-language processing request not recited in a query language.

8. The method of claim 1, wherein the plurality of options further include an option to process a stored data processing request to generate the new data processing request output.

9. A system comprising:

a processor of a data processing system; and a tangible, non-transitory memory configured to communicate with the processor, the tangible, non-transitory memory having instructions stored thereon that, in response to execution by the processor, cause the processor to:

receive an audio data processing request comprising a technical command to interact with one or more data sources of a data processing system;

translate the audio data processing request into a first data processing request in a database query language that is configured to interact with the one or more data sources of the data processing system;

query a data source of the data processing system specified in the database query language of the first data processing request;

execute the first data processing request using the data source of the data processing system specified in the database query language of the first data processing request;

generate a data processing output based on the executing of the first data processing request by the data processing system;

store the first data processing request and the data processing output in an analytics database;

generate, by the processor, a processor ranking for the stored data processing output based on at least an execution time used to generate the stored data processing output by the data processing system;

obtain a second data processing request;

determine the second data processing request to be similar to the first data processing request;

present, by the processor, a plurality of options for servicing the second data processing request, the plurality of options including an option of processing the second data processing request to generate a new data processing request output and an option to use the stored data processing output for the first data processing request;

transmitting for display, by the processor, processing data associated with the stored data processing output, wherein the processing data comprises an indication of at least a subset of a dataset or data source involved in the stored data processing output and the processing ranking for the stored data processing output;

receive, by the processor, a data processing request selection comprising one of the plurality of options for servicing the second data processing request; and execute, by the processor, the data processing request selection on one or more data sources of the data processing system.

10. The system of claim 9, wherein the instructions, in response to execution by the processor, cause the processor to generate the new data processing request output based at least in part on executing the second data processing request.

11. The system of claim 9, wherein the processing ranking is generated based on an efficiency metric associated with the execution time of the first data processing request and processing usage of the processor and memory while executing the first data processing request.

12. The system of claim 9, wherein the instructions, in response to execution by the processor, cause the processor to determine that the second data processing request at least partially matches the first data processing request by comparing at least one of a type of query, a query data source, or a query dataset.

13. The system of claim 9, wherein the audio data processing request is received from an audio-enabled input source.

14. The system of claim 9, wherein the audio data processing request is received from a user interface-based input source.

15. The system of claim 9, wherein the audio data processing request comprises a plain-language processing request not recited in a query language.

16. The system of claim 9, wherein the first data processing request has a processing ranking based at least in part on an efficiency metric.

17. The system of claim 9, wherein the plurality of options further include an option to process a stored data processing request to generate the new data processing request output.

18. A non-transitory computer readable medium comprising machine readable instructions that, when executed by a processor of a computing device of a data processing system, cause the computing device to at least:

receive an audio data processing request comprising a technical command to interact with one or more data sources of a data processing system;

translate the audio data processing request into a first data processing request in a database query language that is configured to interact with the one or more data sources of the data processing system;

query a data source of the data processing system specified in the database query language of the first data processing request;

execute the first data processing request using the data source of the data processing system specified in the database query language of the first data processing request;

generate a data processing output based on the executing of the first data processing request by the data processing system;

store the first data processing request and the data processing output in an analytics database;

generate a processor ranking for the stored data processing output based on at least an execution time used to generate the stored data processing output by the data processing system;

obtain a second data processing request;

determine the second data processing request to be similar to the first data processing request;

present a plurality of options for servicing the second data processing request, the plurality of options including an option of processing the second data processing request to generate a new data processing request output and an option to use the stored data processing output for the first data processing request;

transmitting for display processing data associated with the stored data processing output, wherein the processing data comprises an indication of at least a subset of a dataset or data source involved in the stored data processing output and the processing ranking for the stored data processing output;

receive a data processing request selection comprising one of the plurality of options for servicing the second data processing request; and execute the data processing request selection on one or more data sources of the data processing system.

19. The non-transitory computer readable medium of claim 18, wherein the plurality of options further include an option to process a stored data processing request to generate the new data processing request output.

20. The non-transitory computer readable medium of claim 18, wherein the processing ranking is generated based on an efficiency metric associated with the execution time of the first data processing request and processing usage of the processor and memory while executing the first data processing request.

* * * * *